United States Patent [19]

Chuang et al.

[11] Patent Number: 4,504,426
[45] Date of Patent: Mar. 12, 1985

[54] GAS-LIQUID CONTACTING APPARATUS

[75] Inventors: Karl T. Chuang, Deep River; Allan E. Everatt, Chalk River, both of Canada

[73] Assignee: Atomic Energy of Canada Limited, Ottawa, Canada

[21] Appl. No.: 482,010

[22] Filed: Apr. 4, 1983

[30] Foreign Application Priority Data

Nov. 24, 1982 [CA] Canada .................................. 416209

[51] Int. Cl.$^3$ .............................................. B01F 3/04
[52] U.S. Cl. ................................. 261/114 R; 202/158
[58] Field of Search ...................... 261/114 R; 202/158

[56] References Cited

U.S. PATENT DOCUMENTS

| | | | |
|---|---|---|---|
| 2,646,977 | 7/1953 | Kraft ................................. | 261/114 R |
| 2,772,080 | 11/1956 | Huggins et al. ................. | 261/114 R |
| 2,787,453 | 4/1957 | Hibshman et al. ............... | 261/114 R |
| 3,410,540 | 11/1968 | Bruckert ......................... | 261/114 R X |
| 3,784,175 | 1/1974 | Hirao et al. ..................... | 261/114 R |
| 3,958,964 | 5/1976 | Koch ............................. | 261/114 R X |
| 4,159,291 | 6/1979 | Bruckert et al. ................. | 202/158 X |
| 4,275,021 | 6/1981 | Kirkpatrick et al. ............ | 261/114 R X |
| 4,278,621 | 7/1981 | Sigmund et al. ................ | 261/114 R |

FOREIGN PATENT DOCUMENTS

| | | | |
|---|---|---|---|
| 627942 | 3/1936 | Fed. Rep. of Germany ... | 261/114 R |
| 823108 | 11/1959 | United Kingdom ........... | 261/114 R |

Primary Examiner—Richard L. Chiesa
Attorney, Agent, or Firm—Francis W. Lemon

[57] ABSTRACT

A gas-liquid contacting apparatus is provided having downcomers which are closed at their lower ends by perforated, inclined, liquid distributing, gas entry retarding, plates. The downcomers each depend from a drainage opening bounded by a weir on a perforated, liquid frothing tray. Alternate trays have central drainage openings and are interposed with trays having drainage openings adjacent opposite tray sides. The trays have liquid frothing perforations across the whole of each tray including the area beneath each drainage opening. The perforations beneath a drainage opening occupy an area per unit area of the drainage opening in the range 0 to 25% less than the perforations per unit area in the remainder of that tray. The apparatus produces a frothing layer on the trays in which the perforated, inclined, liquid distributing, gas entry plates are immersed and, which gives a good liquid flow distribution across the tray so that a high efficiency of contact between the gas and the liquid is achieved. When the plates of the downcomers are at positions above the froth on the perforated plate immediately below then each plate extends substantially horizontally. The perforated, inclined, liquid distributing, gas entry retarding plates extend upwardly along an inclined path towards the direction of flow of frothed liquid across the tray immediately therebelow.

1 Claim, 2 Drawing Figures

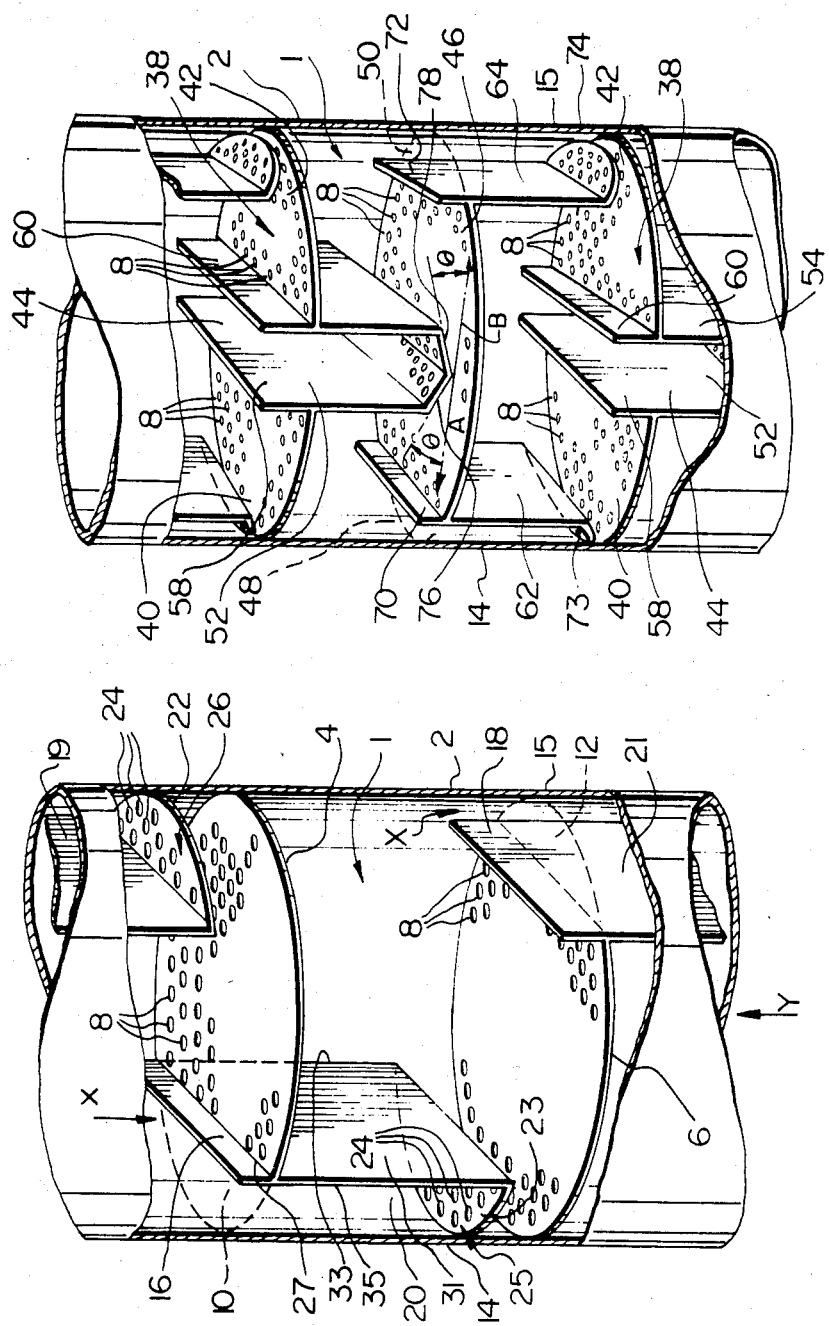

GAS-LIQUID CONTACTING APPARATUS

This invention relates to a gas-liquid contacting apparatus.

It has already been proposed in U.S. Pat. No. 4,278,621, dated July 14, 1981, "Vapor-Liquid Contacting System", P. W. Sigmund et al, FIGS. 4 and 5, to provide a perforated, vapor-liquid contacting tray, in a column, having an open ended downcomer, in the form of an isolated side wall portion of the column, leading to an imperforate portion of the tray. This tray provides upwardly directed laminar jetting of liquid over the tray perforation openings for high selectivity vapor-liquid contacting by means of a high tray pressure drop, i.e. a high velocity of the gas mixture flowing through the open area perforations of the tray member. These trays are designed to increase the liquid handling capabilities on the tray.

While the tray design of P. W. Sigmund et al is useful in that it has a high liquid handling capacity, this is achieved at the expense of the ray efficiency.

Other types of conventional vapor-liquid contactors, which utilize 1- or 2-pass cross-flow trays, because of their long liquid flow path lengths, give the best tray efficiency of all tray types. However, these vapor-liquid contactors sacrifice 10–25% tray area for a downcomer seal pan. This pan, which is nonperforated and part of the tray deck, functions as a bottom to the downcomer. There is a need to improve upon the conventional cross flow type by redesigning the downcomer and the tray deck under the downcomer to: (a) effectively lengthen the liquid flow path, thereby increasing the tray efficiency, and (b) increase the tray bubbling area allowing a greater vapor capacity.

There is also a need for a tray design which gives lower tray pressure drops than a conventional tray in order to minimize the total pressure drop across a stack of trays in a column. In low pressure applications of, say, less than 300 kPa, as in the case of vacuum distillation of heavy water, the mass transfer efficiency is adversely affected by increasing pressure, and therefore, the tray pressure drop becomes the controlling factor in the design of a contactor. Therefore, a device that gives a lower tray pressure drop would have the beneficial effects of giving a higher average mass transfer efficiency for the contactor and/or reducing the size requirements of the tray.

According to the present invention, there is provided a gas-liquid contacting apparatus, comprising:

(a) an upwardly extending casing for the liquid to flow downwardly therethrough and the gas to flow upwardly therethrough, (b) a series of trays extending across and partitioning the casing at different levels, each tray being perforated across each tray, the whole of the area thereof with perforations for causing the liquid to be frothed by the gas, having at least one liquid drainage opening therefrom for the frothed liquid, the liquid drainage openings of successive trays being laterally displaced in opposite directions in the casing to cause the frothed liquid to flow towards, and then away from, opposed casing sides across successive trays, and the perforations of each portion of a tray beneath a drainage opening occupying an area per unit of the drainage opening in the range 0 to 25% less than that of the perforations per unit area in the remainder of that tray, (c) overflow weirs, adjacent the liquid drainage openings, for maintaining a layer of frothed liquid on each tray and from which the frothed liquid will overflow into the adjacent liquid drainage opening, (d) for each drainage opening, a downcomer depending therefrom and for delivering the frothing liquid to a position above the level of the tray immediately below, and (e) for each downcomer, a liquid distributing and gas entry retarding plate closing the outlet end of that downcomer, each plate having liquid distributing perforations distributed across the whole of the area of the side face thereof, each plate extending upwardly at an angle $\theta$ in the range 45° to 60° to the horizontal, in the direction for flow of liquid across the perforated tray immediately therebelow, the plate when intended to be immersed in the froth on the tray immediately therebelow.

Alternate trays have a central liquid drainage opening and these trays are interposed with trays having two liquid drainage openings adjacent opposite sides of the casing so that the apparatus is a two flow path apparatus wherein the flow paths alternately flow towards and then away from each other, for each liquid drainage opening there is provided an overflow weir, a downcomer, and a liquid distributing and gas entry retarding plate.

The plates for the downcomers of the central drainage openings are in two halves which together form a V-shape by each plate half extending upwardly at an angle $\theta$ in the range 30° to 60° to the horizontal, in the direction for flow of liquid therefrom across the perforated tray immediately therebelow.

Preferably, each liquid drainage opening adjacent a side of the casing is substantially segmented in plan view, and is bounded by a curved portion of the casing and a substantially straight edge of the plate, and the downcomer therefrom comprises a downcomer plate, depending from and sealed at its upper edge to a marginal portion of the plate adjacent the substantially straight edge, and the curved portion of the casing, to which the depending sides of the downcomer plate are sealed to the casing.

In the accompanying drawings which illustrate, by way of example, a gas-liquid contacting device having drainage openings only adjacent tray sides, and an apparatus according to the present invention, FIG. 1 is a perspective view of a lengthwise extending portion of a gas-liquid contacting apparatus with a portion of the casing removed to reveal the interior and show that drainage openings are only provided adjacent tray sides; and FIG. 2 is a similar sectional side view of a portion of the gas-liquid contacting device to that shown in FIG. 1, but showing a device having central drainage openings in alternate plates.

Referring now to FIG 1, there is shown a gas-liquid contacting apparatus, generally designated 1, comprising:

(a) an upwardly extending casing 2 for the liquid to flow downwardly therethrough in the direction of arrow X, and the gas to flow upwardly therethrough in the direction of arrow Y, (b) a series of trays, such as trays 4 and 6, extending across and partitioning the casing at different levels, each tray being perforated across the whole of the area thereof with perforations 8 for causing the liquid to be frothed by the gas, each tray (4 and 6) having at least one liquid drainage opening, 10 and 12 respectively, therefrom for the frothed liquid, the liquid drainage openings, 10 and 12, of successive trays, 4 and 6, being laterally displaced in opposite directions in the casing 2 to cause the frothed liquid to flow towards, and then away from, opposed casing sides, 14 and 15, across successive trays, and the perforations 8 of each portion of a tray beneath a drainage opening, 10 or 12, occupying an area per unit area of the drainage opening in the range 0 to 25% less than that of the perforations per unit area in the remainder of that tray, (c) overflow weirs, such as weirs 16 and 18, adjacent the liquid drainage openings, 10 and 12 respectively, for maintaining a layer of frothed liquid on each tray, such as 4 and 6, and from which the frothed liquid will overflow into the adjacent liquid drainage opening, such as openings 10 and 12, (d) for each drainage opening, such as 10 and 12, a downcomer, 19 to 21, depending therefrom and for delivering the frothed liquid to a position above the level of the tray, 4 or 6, immediately below, and (e) for each downcomer, such as 19 or 20, a liquid distributing and gas entry retarding plate, 22 or 23 respectively, closing the outlet end of that downcomer, 19 or 20, each plate, 22 or 23, having liquid distributing perforations 24 distributed across the whole of the area of the side face, 25 or 26 respectively, thereof, each plate, 22 or 23, extending upwardly at an angle $\theta$ in the range 30° to 60° to the horizontal as shown in FIG. 3, in the direction for flow Z of liquid across the perforated tray 6 immediately therebelow, and, in operation, being immersed in the froth on the tray 6 immediately therebelow.

It should be noted that each liquid drainage opening, such as 10, adjacent a side 14 of the casing 2 is substantially segmented in plan view, and is bounded by a curved portion of the casing 2 and a substantially straight edge 27 of the weir 16, and the downcomer 20 therefrom comprises a downcomer 31, depending from and sealed at its upper edge to a marginal portion of the tray 4 adjacent the substantially straight edge 27, and the curved portion of the casing 2, to which the depending sides 33 and 35 of the downcomer plate 31 are sealed.

The reduction in perforated area beneath each liquid drainage opening improves the gas-liquid contact where the greatest mass flow of liquid occurs on each tray 4 and 6.

In operation, liquid is fed to an upper downcomer while gas is fed upwardly through a conventional distributor (not shown) beneath a lowermost tray. A substantial portion of the liquid cascades over the weirs, such as 16 and 18, from one tray to another to flow back and forth across the successive trays, such as 4 and 6, between one side 14 of the casing 2 and the other side 15. A substantial portion of the gas passes upwardly through the perforations 8 causing liquid flowing across the trays to be frothed.

Hydraulic tests were carried out on the apparatus shown in FIG. 1 having a 0.61 m diameter air-liquid water column. The trays occupied 90% of the cross-sectional area of the casing 2 with the remaining 10% occupied by the downcomer.

The tests indicated that by using downcomers of the type shown in FIGS. 1 to 3, the gas pressure drop across the trays was reduced when compared with conventional apparatus. The tests also indicated that, for a given gas pressure drop, the downcomers shown in FIG. 1 could handle 10% by volume greater gas flows than conventional downcomers. Similarly, the gas handling capacity of the trays was found to increase in about the same proportion of 10% by volume over conventional trays.

The tests also revealed that when the top of the froth on a tray, such as 6, is higher than the bottom of the downcomer 20, i.e. the plate 23 is immersed in the froth, then if the plate 23 extends substantially horizontally, it tends to reduce the bubbling action under the plate 23. A reduced bubbling action under the plate 23 causes less bubbles to be present at this location resulting in a relatively higher liquid content being present to that of the remainder of the tray surface. This results in a poor air/water mass transfer under the plate 23, and causes an increase in the total pressure drop in air, flowing upwardly through the tray perforations, due to the increased hydrostatic head of water under the plate 23. It was found that this problem is corrected by extending the plate 23 upwardly at an angle $\theta$ to the horizontal, in the direction of flow Z of liquid across the tray 6, as shown in FIG. 1.

The following table shows the results of air/liquid water tests relating the air pressure drop P, through the tray 6, to the angle of inclination $\theta$ for different flow rates of the air and the liquid water.

| Degree of Inclination ($\theta$°) | Air Mass Flow Rate (kg/s) | Liquid Water Vol. Flow Rate (L/min) | Pressure Drop (P cm water) |
|---|---|---|---|
| 0  | 0.3246 | 42 | 5.8 |
| 30 | "      | ,  | 5.5 |
| 45 | "      | ,  | 5.2 |
| 70 | "      | ,  | *   |
| 0  | "      | 72 | 6.0 |
| 30 | "      | ,  | 6.0 |
| 45 | "      | ,  | 5.6 |
| 70 | "      | ,  | *   |
| 0  | 0.4361 | 42 | 7.1 |
| 30 | "      | ,  | 7.0 |
| 45 | "      | ,  | 6.5 |
| 70 | "      | ,  | *   |
| 0  | "      | 72 | 7.4 |
| 30 | "      | ,  | 7.2 |
| 45 | "      | ,  | 7.0 |
| 70 | "      | ,  | *   |

* indicates that the air bypassed the tray 6 by passing upwardly through the downcomer 20

The table shows that the initial pressure drop P decreases as the angle of inclination $\theta$ is increased. Visual observations during the tests indicated that when $\theta$ greater than the order of 45°, the froth under the downcomer exhibited similar characteristics to the froth elsewhere on that tray. The results indicated that within limits the greater the angle $\theta$ the better the frothing that occurs because bubbles escape more easily from under the plate 23. However, the results also indicated that when $\theta > 60°$, air bypasses the tray 6 by passing upwardly through the downcomer 20. This resulted in a back-up of water in the downcomer 20 and hydraulic instability across the tray 6.

From the tests it was deduced that in order to avoid the necessity of an unduly large spacing between the trays to avoid a back-up of water in the downcomers, angles $\theta$ greater than 60° and less than 30° are impractical when the plate 21 is immersed in the froth. An angle in the range 45° to 60° is preferred.

In FIG. 2, similar parts to those shown in FIG. 1 are designated by the same reference numerals and the previous description is relied upon to describe them.

In FIG. 2, there is shown an embodiment of the present invention wherein the liquid flows from a central portion of the casing 2 towards, and then away from, opposed sides 14 and 15 of the casing 2. To achieve this, alternate trays, two of which are shown and are generally designated 38, are in tray halves 40 and 42, which are on each side of a central, drainage opening 44, while trays, such as the one shown and designated 46, have opposed, drainage openings 48 and 50.

The tray halves 40 and 42 have a central downcomer 52, liquid distributing plate 56, and overflow weirs 58 and 60. The trays, such as tray 46, have downcomers 62 and 64, liquid distributing plates 73 and 74 and overflow weirs 70 and 72.

In FIG. 2, the liquid distributing plates 73 and 74 of downcomers 62 and 64, respectively, are inclined in a similar manner to the liquid distributing plates 22 and 23 of FIG. 1. The central downcomer 52 has distributing plate halves 76 and 78 which together form a V-shape by each plate half extending upwardly at an angle $\theta$ in the range 30° to 60° to the horizontal, in the direction A or B for flow of liquid therefrom across the perforated tray 46 immediately therebelow.

In FIG. 2 the liquid distributing plates 73 and 74 and the liquid distributing plate halves 76 and 78 are intended to be immersed in the froths on the trays immediately below them.

We claim:

1. A gas-liquid contacting apparatus comprising:
    (a) an upwardly extending casing for the liquid to flow downwardly therethrough and the gas to flow upwardly therethrough,
    (b) a series of trays extending across and partitioning the casing at different levels, each tray being perforated across the whole of the area thereof with perforations for causing the liquid to be frothed by the gas, each tray having at least one liquid drainage opening therefrom for the frothed liquid, the liquid drainage openings of successive trays being laterally displaced in opposite directions in the casing to cause the frothed liquid to flow towards, and then away from, opposed casing sides across successive trays, and the perforations of each portion of a tray beneath a drainage opening occupying an area per unit area of the drainage opening in the range 0 to 25% less than that of the perforations per unit in the remainder of that tray,
    (c) overflow weirs, adjacent the liquid drainage openings, for maintaining a layer of frothed liquid on each tray and from which the frothed liquid will overflow into the adjacent liquid drainage opening,
    (d) for each drainage opening, a downcomer depending therefrom and for delivering the frothing liquid to a position above the level of the tray immediately below, and
    (e) for each downcomer, a liquid distributing and gas entry retarding plate closing the outlet end of that downcomer, each plate having liquid distributing perforations distributed across the whole of the area of the side face thereof, each plate extending upwardly at an angle $\theta$ in the range 45° to 60° to the horizontal, in the direction for flow of liquid across the perforated tray immediately therebelow, the plate being intended to be immersed in the froth on the tray immediately therebelow, and wherein the improvement comprises,
    (f) alternate trays have a central liquid drainage opening and these trays are interposed with trays having two liquid drainage openings adjacent opposite sides of the casing so that the apparatus is a two flow path apparatus wherein the flow paths alternately flow towards and then away from each other, and for each liquid drainage opening there is provided an overflow weir, a downcomer, and a liquid distributing and gas entry retarding plate closing the outlet end of that downcomer, each plate having liquid distributing perforations distributed across the whole area of the side face thereof, and the plates for the dowcomers of the central drainage openings being in two halves which together form a V-shape by each plate half extending upwardly at an angle $\theta$ in the range 30° to 60° to the horizontal in the direction for flow of liquid therefrom across the perforated tray immediately therebelow.

* * * * *